(12) United States Patent
Huang et al.

(10) Patent No.: US 11,378,548 B2
(45) Date of Patent: Jul. 5, 2022

(54) DEVICE AND METHOD FOR TESTING STEEL DEFECT BASED ON INTERNAL AND EXTERNAL MAGNETIC PERTURBATION

(71) Applicant: Tsinghua University, Beijing (CN)

(72) Inventors: Songling Huang, Beijing (CN); Wenzhi Wang, Beijing (CN); Wei Zhao, Beijing (CN); Shen Wang, Beijing (CN); Zijing Huang, Beijing (CN); Xiaochun Song, Beijing (CN); Lisha Peng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/146,703

(22) Filed: Jan. 12, 2021

(65) Prior Publication Data
US 2021/0396711 A1 Dec. 23, 2021

(30) Foreign Application Priority Data

Jun. 17, 2020 (CN) .......................... 202010556179.4

(51) Int. Cl.
*G01N 27/87* (2006.01)
*G01N 27/90* (2021.01)

(52) U.S. Cl.
CPC ......... *G01N 27/87* (2013.01); *G01N 27/9073* (2013.01)

(58) Field of Classification Search
CPC ............. G01N 27/82–83; G01N 27/87; G01N 27/90–9093

(Continued)

(56) References Cited

U.S. PATENT DOCUMENTS 5,293,117 A * 3/1994 Hwang .................. G01N 27/82
324/242
5,804,964 A * 9/1998 Hamelin ................ G01N 27/82
324/242

(Continued)

FOREIGN PATENT DOCUMENTS

CN 108918655 A * 11/2018 ............. G01N 27/83

OTHER PUBLICATIONS

Cai et al., "Finite Element Analysis and Optimum Design of Permanent Magnetic Field Perturbation Testing," Transactions of China Electrotechnical Society, Feb. 2015, vol. 30, No. 3.

(Continued)

*Primary Examiner* — Judy Nguyen
*Assistant Examiner* — Rahul Maini
(74) *Attorney, Agent, or Firm* — Hodgson Russ LLP (57) ABSTRACT

A device and a method for testing a steel defect based on internal and external magnetic perturbation. The device includes: a magnetizer comprising a magnetization source and a magnet yoke, arranged on a surface of a sample, and configured to generate two types of typical magnetic field regions applied to testing based on internal and external magnetic perturbation; a double-row magnetic sensor probe, configured to collect internal and external magnetic perturbation data; a master controller, configured to perform pre-processing on the internal and external magnetic perturbation data, and store the pre-processed data; scanner wheels, configured to generate a sampling trigger pulse during scanning to enable the master controller to receive the internal and external magnetic perturbation data from the probes; and a host computer, configured to analyze the pre-processed data uploaded by the master controller to obtain a defect quantitative result.

13 Claims, 4 Drawing Sheets

(58) Field of Classification Search
USPC .............. 324/219–222, 227–230, 239–243
See application file for complete search history.

(56) References Cited

U.S. PATENT DOCUMENTS

| | | | | |
|---|---|---|---|---|
| 10,088,453 B2* | 10/2018 | Lee | ............... | G01N 27/82 |
| 10,317,372 B2* | 6/2019 | Carrasco Zanini | .. | G01N 29/225 |
| 2012/0253696 A1* | 10/2012 | Pearson | ............... | G01N 27/82 |
| | | | | 702/38 |

OTHER PUBLICATIONS

CNIPA, First Office Action for CN Application No. 202010556179.4, dated Jan. 4, 2022.

* cited by examiner

| | |
|---|---|
| generating, by a magnetizer, two types of typical magnetic field regions applied to testing based on internal and external magnetic perturbation by placing the magnetizer on a surface of a sample | S701 |
| collecting, by a double-row magnetic sensor probe, internal and external magnetic perturbation data in response to a sampling trigger pulse, performing pre-processing on the internal and external magnetic perturbation data and storing the pre-processed data by a master controller | S702 |
| performing a defect quantitative analysis by analyzing the pre-processed data to obtain a defect quantitative result | S703 |

Fig. 7

DEVICE AND METHOD FOR TESTING STEEL DEFECT BASED ON INTERNAL AND EXTERNAL MAGNETIC PERTURBATION

CROSS-REFERENCE TO RELATED APPLICATION

This application claims priority to and benefits of Chinese Patent Application Serial No. 202010556179.4, filed with the State Intellectual Property Office of P. R. China on Jun. 17, 2020, the entire contents of which is incorporated herein by reference.

FIELD

The present disclosure relates to a field of nondestructive testing technologies, and more particularly to a device and a method for testing a steel defect based on internal and external magnetic perturbation.

BACKGROUND

In the long-term operation of steel equipment, corrosion of the medium, aging of the steel material itself, and impact of external forces may inevitably lead to defects on the surface or inside of the equipment. The deterioration of defects may lead to serious safety incidents. Therefore, it is of great significance to carry out on-line or off-line nondestructive testing on equipment regularly.

SUMMARY

Embodiments of the present disclosure provide a device for testing a steel defect based on internal and external magnetic perturbation. The device includes: a magnetizer comprising a magnetization source and a magnet yoke, arranged on a surface of a sample, and configured to generate two types of typical magnetic field regions applied to testing based on internal and external magnetic perturbation; a double-row magnetic sensor probe, configured to collect internal and external magnetic perturbation data; a master controller, configured to perform pre-processing on the internal and external magnetic perturbation data, and store the pre-processed data; scanner wheels, configured to generate a sampling trigger pulse during scanning to enable the master controller to receive the internal and external magnetic perturbation data from the probe; and a host computer, configured to analyze the pre-processed data uploaded by the master controller to obtain a defect quantitative result.

Embodiments of the present disclosure provide a method for testing a steel defect based on internal and external magnetic perturbation. The method includes: generating, by a magnetizer, two types of typical magnetic field regions applied to testing based on internal and external magnetic perturbation by placing the magnetizer on a surface of a sample; collecting, by a double-row magnetic sensor probe, internal and external magnetic perturbation data in response to a sampling trigger pulse; performing pre-processing on the internal and external magnetic perturbation data and storing the pre-processed data by a master controller; and performing a defect quantitative analysis by analyzing the pre-processed data to obtain a defect quantitative result.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS magnetization source 1, magnet yoke 2, double-row magnetic sensor probe 3, master controller 4, scanner wheels 5, host computer 6, steel plate 7 to be tested, connector 8, mileage trigger module 9, typical distribution 101 of magnetic induction lines of internal perturbation, typical distribution 102 of magnetic induction lines of external perturbation, 303—C8051F930 microcontroller.

DETAILED DESCRIPTION

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

In order to solve the problems of low detection sensitivity and low three-dimensional inversion accuracy due to the limitations of the testing method in the related art, the present disclosure provides a device and a method for testing a steel defect based on internal and external magnetic perturbation.

A device and a method for testing a steel defect based on internal and external magnetic perturbation according to the embodiments of the present disclosure are described with reference to the accompany drawings in the following. Firstly, the device for testing a steel defect based on internal and external magnetic perturbation according to the embodiments of the present disclosure is described with reference to the accompany drawings.

Figure 1:
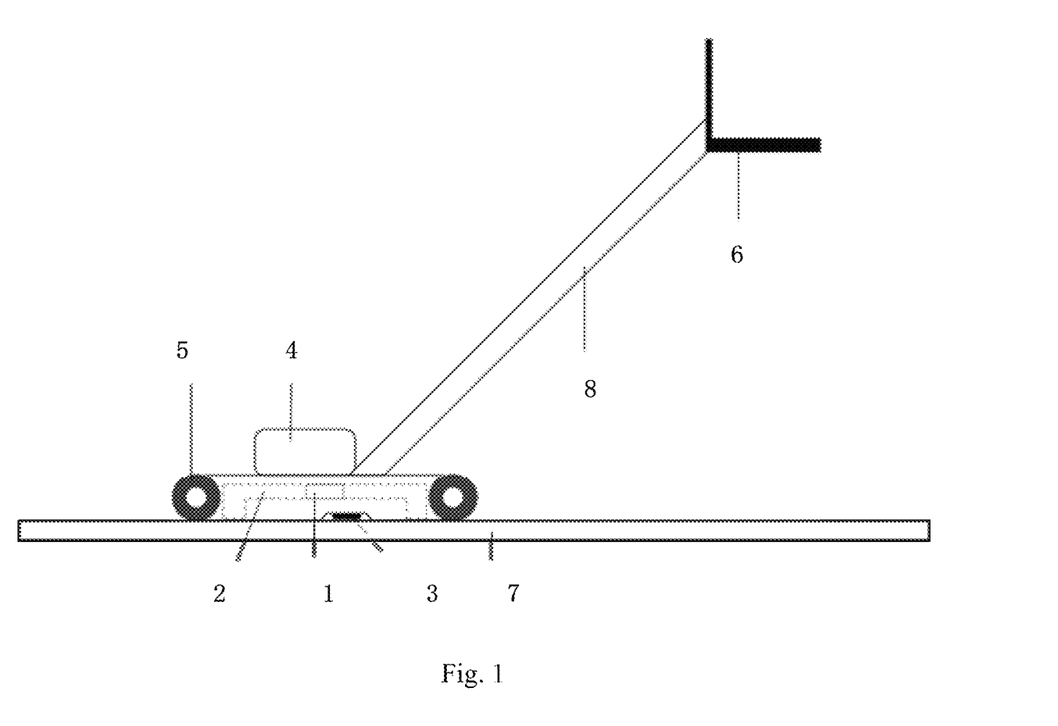
FIG. 1 is a schematic diagram illustrating a device for testing a steel defect based on internal and external magnetic perturbation according to an embodiment of the present disclosure.

FIG. 1 is a schematic diagram illustrating a device for testing a steel defect based on internal and external magnetic perturbation according to an embodiment of the present disclosure.

As illustrated in FIG. 1, the device for testing a steel defect based on internal and external magnetic perturbation includes a magnetizer, a double-row magnetic sensor probe 3, a master controller 4, scanner wheels 5, and a host computer 6.

In detail, the magnetizer includes a magnetization source 1 and a magnet yoke 2. The magnetizer is arranged on the surface of a sample, and configured to generate two types of typical magnetic field regions applied to testing based on internal and external magnetic perturbation.

In an embodiment of the present disclosure, the magnetization source 1 may be a permanent magnet or a coil with direct current applied. A shape of the magnet yoke 2 may be L-shape, U-shape or arc-shape. When the magnetizer consisting of the magnetization source 1 and the magnet yoke 2 is placed on the surface of the sample, such as a steel plate 7 to be tested, two types of typical magnetic field regions are generated above the steel plate 7. The N and S pole directions of the permanent magnet are interchangeable.

The double-row magnetic sensor probe 3 is configured to collect internal and external magnetic perturbation data.

In an embodiment of the present disclosure, the two types of typical magnetic fields include a first region and a second region. A first row of magnetic sensors of the double-row magnetic sensor probe 3 located in the first region, and a second row of magnetic sensors of the double-row magnetic sensor probe 3 located in the second region. When the device scans the defect-carried sample, internal magnetic perturbation is generated in the first region and external magnetic perturbation is generated in the second region. When the steel plate has no defect, the collected data is non-perturbed magnetic field data.

Figure 2:
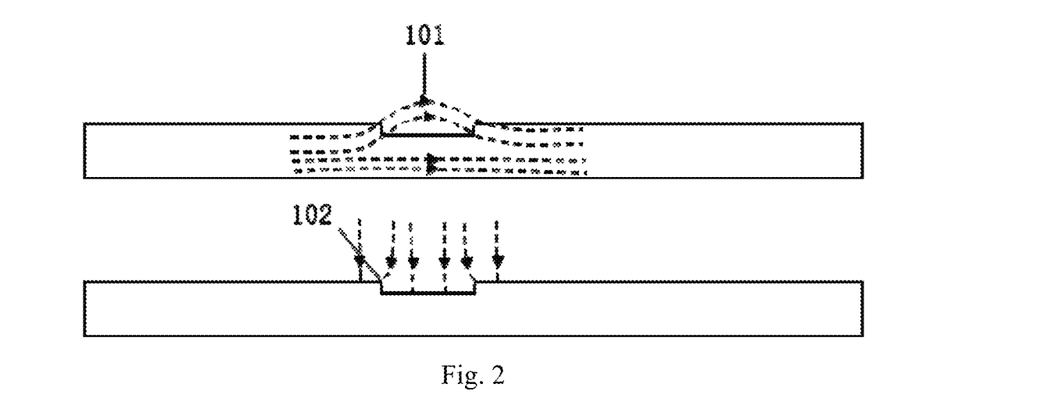
FIG. 2 is a schematic diagram illustrating distribution of magnetic induction lines caused by defects according to an embodiment of the present disclosure.

In some embodiments, as illustrated in FIG. 2, a magnetic-field component perpendicular to the sample in the first region of the typical regions is very small, and the interior of the sample corresponding the first region approximates a magnetic saturation state. While, there is a strong and nearly uniform spatial stray magnetic field perpendicular to the sample surface in the second region.

In an actual implementing process, when there is a defect on the surface of the steel plate 7 to be tested, strong internal magnetic perturbation may be generated in the first region, such as a typical distribution 101 of magnetic induction lines of internal perturbation. In the meantime, strong external magnetic perturbation may be generated in the second region, such as a typical distribution 102 of magnetic induction lines of external perturbation. The internal and external magnetic perturbations have different response characteristics, thus an omnidirectional defect testing may be realized by integrating the internal and external magnetic perturbations, and the accuracy of defect quantitative evaluation is improved.

In an embodiment of the present disclosure, the first row of magnetic sensors and the second row of magnetic sensors are arranged in parallel. A distance between the first row of magnetic sensors and the second row of magnetic sensors is between 2 and 5 cm. The number of magnetic sensors in each row is equal. An arrangement mode of the first row of magnetic sensors and the second row of magnetic sensors may be adjusted based on the shape of the detected surface. The arrangement mode includes straight line configuration or curve configuration. A sampling lift-off of each magnetic sensor is between 0.1 and 4 mm.

In detail, the magnet yoke 2 may consist of two L-shaped yokes. The magnetizer consisting of the magnetization source 1 and the magnet yoke 2 may generate the typical magnetic fields applied to testing based on internal and external magnetic perturbation. It may be understood that, based on the description of other relevant embodiments, the magnetizer consisting of the magnetization source 1 and the magnet yoke 2 generates the typical magnetic fields applied to testing based on internal and external magnetic perturbation, and the double-row magnetic sensor probe 3 collects the internal and external magnetic perturbation data for further processing in embodiments of the present disclosure.

Figure 3:
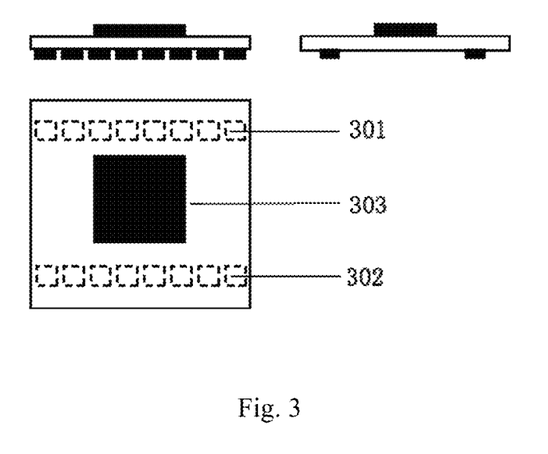
FIG. 3 is a schematic diagram illustrating three-view drawings of a circuit plate of a double-row magnetic sensor probe in a device for testing a steel defect based on internal and external magnetic perturbation according to an embodiment of the present disclosure.

Embodiments are listed below for illustrative explanation. As illustrated in FIG. 3, three-view drawings of a double-row magnetic sensor probe is shown. The first row of magnetic sensors is an internal magnetic perturbation sensor array 302. The second row of magnetic sensors is an external magnetic perturbation sensor array 301. The internal magnetic perturbation sensor array 302 and the external magnetic perturbation sensor array 301 are located at opposite ends of one side of a circuit board, parallel to each other, and a C8051F930 microcontroller 303 is located at the other side of the circuit board. The microcontroller 303 packages the collected data and sends the packaged data to the master controller 4.

Figure 4:
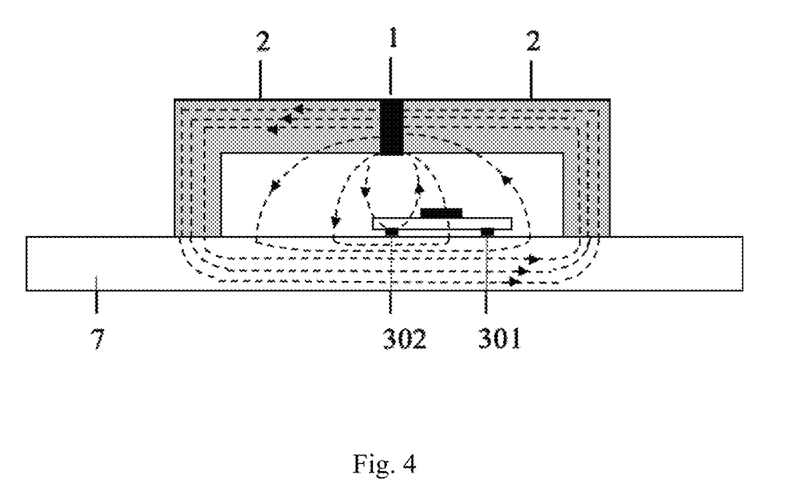
FIG. 4 is a schematic diagram illustrating position of a probe and distribution of magnetic induction lines of a magnetizer in a device for testing a steel defect based on internal and external magnetic perturbation according to an embodiment of the present disclosure.

Further, as illustrated in FIG. 4, distribution of spatial magnetic induction lines when the magnetizer including the magnetization source 1 and the magnet yoke 2 scans the steel plate 7 to be tested is shown. The double-row magnetic sensor probe 3 is located below the magnetizer. In detail, the internal magnetic perturbation sensor array 302 is located directly below the permanent magnet 1. The distance between the external magnetic perturbation sensor array 301 and the internal magnetic perturbation sensor array 302 is 2.5 cm.

It should be understood that, the magnetizer including the magnetization source 1 and the magnet yoke 2 keeps synchronous motion with the double-row magnetic sensor probe 3 in the scanning direction. The double-row magnetic sensor probe 3 may move up and down in the vertical direction of space according to the shape of the defect. The external magnetic perturbation sensor array 301 may be located at the right side or the left side of the internal magnetic perturbation sensor array 302, which is not limited herein.

The master controller 4 may contain the signal processor, a lithium battery, or other electronic components. The master controller 4 is configured to perform pre-processing on the internal and external magnetic perturbation data, and store the pre-processed data.

In some embodiments of the present disclosure, for the above-mentioned further processing, the master controller 4 may contain the signal processor and the lithium battery. The lithium battery is configured to supply power to the device. The signal processor is configured to perform the pre-processing on the data collected by the magnetic sensors, and store the pre-processed data in a hard disk.

The scanner wheels 5 are configured to generate a sampling trigger pulse during scanning to enable the master controller 4 to receive the internal and external magnetic perturbation data from the probe.

Figure 5:
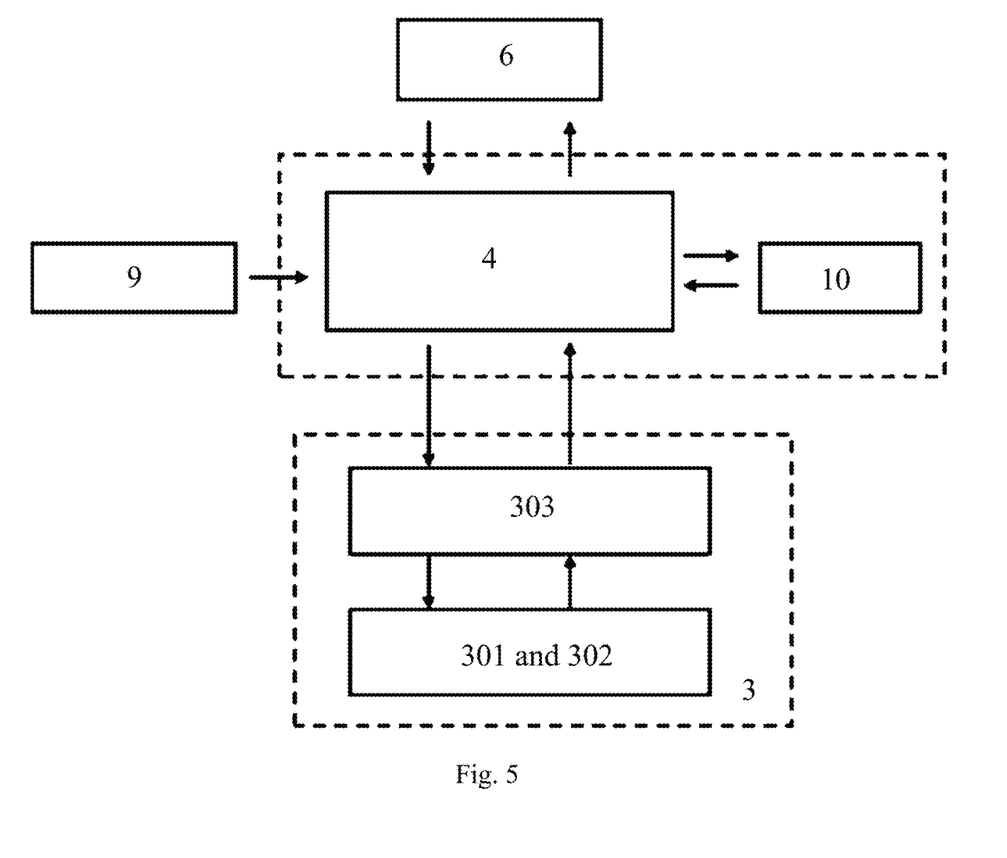
FIG. 5 is a schematic diagram illustrating an electrical part of a device for testing a steel defect based on internal and external magnetic perturbation according to an embodiment of the present disclosure.

For example, as illustrated in FIG. 1, a magnetization direction of the magnetization source 1 is parallel to a scanning direction of the device. Each time the scanner wheels 5 scan for 1 mm, a mileage trigger module 9 generates one sampling trigger pulse, as shown in FIG. 5, the double-row magnetic sensor probe 3 collects the internal and external magnetic perturbation data, the signal processor in the master controller 4 processes the data collected by the double-row magnetic sensor probe, and stores the processed data to the hard disk 10.

The host computer 6 is configured to analyze the pre-processed data uploaded by the master controller to obtain a quantitative result of a defect of the sample.

It may be understood that, the processed data sent from the master controller 4 is analyzed and displayed in real time by the host computer 6 connected by a connector 8.

Embodiments and illustrative explanation s are listed below.

Figure 6:
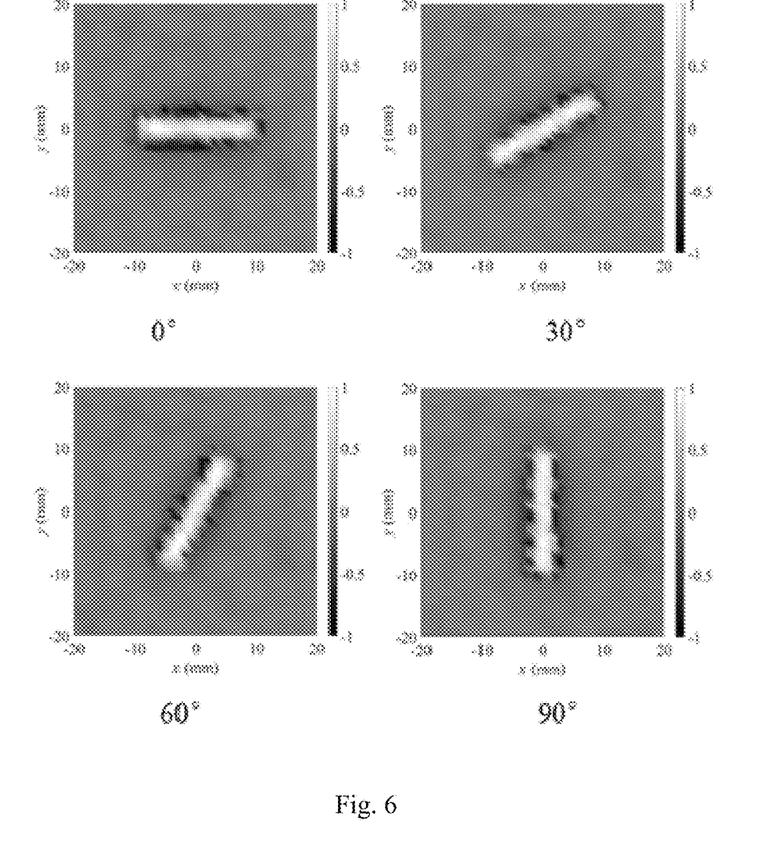
FIG. 6 a schematic diagram illustrating opening imaging when a device for testing a steel defect based on internal and external magnetic perturbation scans defects with angles of 0°, 30°, 60°, and 90° from the scanning direction respectively according to an embodiment of the present disclosure.

A size of a selected steel plate 7 to be tested is 1500× 400×12 mm, and materials of the steel plate is FeQ235. 4 artificial rectangular defects with 20 mm length, 4 mm width, and 2 mm depth are prepared every 25 cm on the steel plate. Angles between a long side of the defects and the scanning direction are 0°, 30°, 60°, and 90° respectively. A speed of the device is set as 1 mm/s. Opening imaging of the defects are illustrated in FIG. 6. Depth evaluation to the defects made by the host computer are 2.04 mm, 2.08 mm, 2.11 mm, and 2.07 mm respectively.

The results indicate that, by testing the defects with the device based on internal and external magnetic perturbation, the defects can be well detected and quantified. The device based on internal and external magnetic perturbation according to embodiments of the present disclosure has accurate quantification capability for all directional defects.

In detail, as illustrated in FIG. 1, when scanning, the scanner wheels 5 generate one sampling trigger pulse every 1 mm. After receiving the trigger signal, a STM32F407 microcontroller in the master controller 4 sends a data collection instruction. A C8051F930 microcontroller in the double-row magnetic sensor probe 3 collects data of the internal magnetic perturbation sensor array 302 and the external magnetic perturbation sensor array 301 after receiving the instruction, then packages and sends the data to the STM32F407 microcontroller. On the one hand, the data is stored in the hard disk 10, on the other hand, the data is processed by the STM32F407 microcontroller and then sent to the host computer 6 for quantitative analysis.

With the device for testing a steel defect based on internal and external magnetic perturbation according to embodiments of the present disclosure, the magnetizer containing the magnetization source and the magnet yoke is placed on the surface of the sample, so that two kinds of typical magnetic field regions are generated above the sample to be tested. The magnetic-field component perpendicular to the sample in the first region is small, and the interior of the sample corresponding the first region approximates a magnetic saturation state. There is a strong and nearly uniform spatial stray magnetic field perpendicular to the sample surface in the second region. Thereby, once there is a defect on the surface of the sample, the strong internal magnetic perturbation may be generated in the first region, and the strong external magnetic perturbation may be generated in the second region. The internal and external magnetic perturbations have different response characteristics, thus the omnidirectional defect testing may be realized by integrating the internal and external magnetic perturbations, and the accuracy of defect quantitative evaluation is improved.

In addition, the device for testing a steel defect based on internal and external magnetic perturbation according to embodiments of the present disclosure has the advantages of simple structure, easy operation and low energy consumption, which can realize accurate detection of omnidirectional defects and integrating internal and external perturbation data may significantly improve accurate of three-dimensional inversion.

In addition, a method for testing a steel defect based on internal and external magnetic perturbation according to embodiments of the present disclosure will be described with reference to the accompany drawings.

Figure 7:
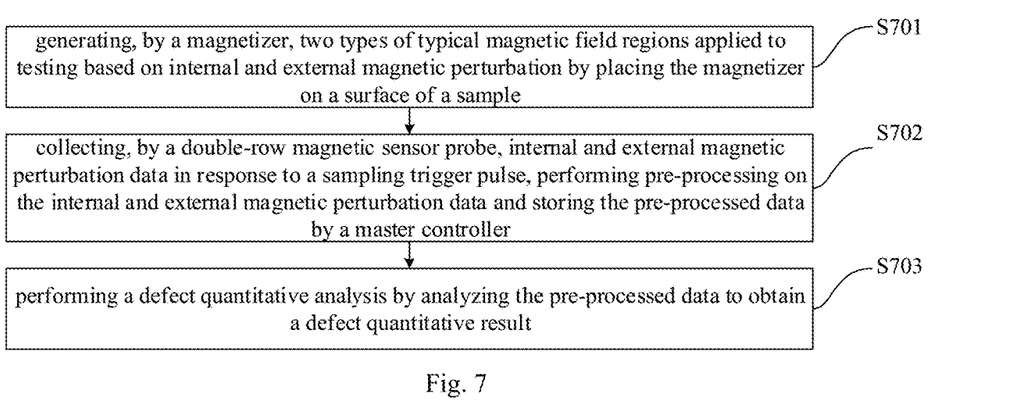
FIG. 7 a flow chart of a method for testing a steel defect based on internal and external magnetic perturbation according to an embodiment of the present disclosure.

FIG. 7 a flow chart of a method for testing a steel defect based on internal and external magnetic perturbation according to an embodiment of the present disclosure.

As illustrated in FIG. 7, the method for testing a steel defect based on internal and external magnetic perturbation may include follows.

At block S701, a magnetizer is placed on a surface of a sample, and the magnetizer generates two types of typical magnetic field regions applied to testing based on internal and external magnetic perturbation.

At block 702, a double-row magnetic sensor probe collects internal and external magnetic perturbation data in response to a sampling trigger pulse, and a master controller performs pre-processing on the internal and external magnetic perturbation data and stores the pre-processed data.

At block 703, a defect quantitative analysis is performed by analyzing the pre-processed data to obtain a defect quantitative result.

It should be noted that, the foregoing explanations in the embodiments of the device for testing a steel defect based on internal and external magnetic perturbation may also be applied to the method for testing a steel defect based on internal and external magnetic perturbation according to this embodiment, which is not repeated herein.

With method for testing a steel defect based on internal and external magnetic perturbation according to embodiments of the present disclosure, the magnetizer containing the magnetization source and the magnet yoke is placed on the surface of the sample, so that two types of typical magnetic field regions are generated above the sample to be tested. The magnetic-field component perpendicular to the sample in the first region is small, and the interior of the sample corresponding the first region approximates a magnetic saturation state. There is a strong and nearly uniform spatial magnetic field perpendicular to the sample surface in the second region. Thereby, once there is a defect on the surface of the sample, the strong internal magnetic perturbation may be generated in the first region, and the strong external magnetic perturbation may be generated in the second region. The internal and external magnetic perturbations have different response characteristics, thus the omnidirectional defect testing may be realized by integrating the internal and external magnetic perturbations, and the accuracy of defect quantitative evaluation is improved.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In the specification, unless specified or limited otherwise, relative terms such as "central", "longitudinal", "lateral", "front", "rear", "right", "left", "inner", "interior", "outer", "lower", "upper", "horizontal", "vertical", "above", "below", "up", "top", "behind", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

Terms concerning attachments, coupling and the like, such as "connected" and "interconnected", refer to a relationship in which structures are secured or attached to one another either directly or indirectly through intervening structures, as well as both movable or rigid attachments or relationships, unless expressly described otherwise.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items. It should be further understood that, when used in the specification, terms "comprising" and/or "containing" specify the presence of stated features, operations, elements and/or components, but do not exclude the presence or addition of one or more other features, operations, elements, components and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A device for testing a steel defect based on internal and external magnetic perturbation, comprising:
    a magnetizer comprising a magnetization source and two magnet yokes, wherein, the two magnet yokes are located at two sides of the magnetization source, the magnetizer is arranged on a surface of a sample, and the magnetizer is configured to generate two types of typical magnetic field regions applied to testing based on internal and external magnetic perturbation;
    a double-row magnetic sensor probe, configured to collect internal and external magnetic perturbation data, wherein a first row of magnetic sensors of the double-row magnetic sensor probe is an internal magnetic perturbation sensor array, a second row of magnetic sensors of the double-row magnetic sensor probe is an external magnetic perturbation sensor array, the internal magnetic perturbation sensor array is located below the magnetization source and not in contact with the magnetization source, and the external magnetic perturbation sensor array is located at any of two sides of the internal magnetic perturbation sensor array;
    a master controller, configured to perform pre-processing on the internal and external magnetic perturbation data, and store the pre-processed data;
    scanner wheels, configured to generate a sampling trigger pulse during scanning to enable the master controller to receive the internal and external magnetic perturbation data from the probe; and
    a host computer, configured to analyze the pre-processed data uploaded by the master controller to obtain a defect quantitative result.

2. The device according to claim 1, wherein, the two types of typical magnetic field regions comprise a first region and a second region, the first row of magnetic sensors of the double-row magnetic sensor probe located in the first region, and the second row of magnetic sensors of the double-row magnetic sensor probe located in the second region, in response to a defect of the sample, internal magnetic perturbation is generated in the first region and external magnetic perturbation is generated in the second region.

3. The device according to claim 2, wherein the first row of magnetic sensors and the second row of magnetic sensors are arranged in parallel, a distance between the first row of magnetic sensors and the second row of magnetic sensors is between 2 to 5 cm, and a number of magnetic sensors in each row is equal.

4. The device according to claim 2, wherein an arrangement mode of the first row of magnetic sensors and the second row of magnetic sensors is adjustable based on a shape of the surface of the sample, the arrangement mode comprises straight line configuration or curve configuration.

5. The device according to claim 3, wherein an arrangement mode of the first row of magnetic sensors and the second row of magnetic sensors is adjustable based on a shape of the surface of the sample, the arrangement mode comprises straight line configuration or curve configuration.

6. The device according to claim 1, wherein a sampling lift-off of a magnetic sensor is between 0.1 to 4 mm.

7. The device according to claim 2, wherein a sampling lift-off of a magnetic sensor is between 0.1 to 4 mm.

8. The device according to claim 3, wherein a sampling lift-off of a magnetic sensor is between 0.1 to 4 mm.

9. The device according to claim 4, wherein a sampling lift-off of a magnetic sensor is between 0.1 to 4 mm.

10. The device according to claim 5, wherein a sampling lift-off of a magnetic sensor is between 0.1 to 4 mm.

11. The device according to claim 1, wherein, the magnetization source comprises a permanent magnet or a coil with direct current applied.

12. The device according to claim 1, wherein a shape of the magnet yoke comprises L-shape, U-shape or arc-shape.

13. A method for testing a steel defect based on internal and external magnetic perturbation, comprising:

generating, by a magnetizer, two types of typical magnetic field regions applied to testing based on internal and external magnetic perturbation by placing the magnetizer on a surface of a sample;

collecting, by a double-row magnetic sensor probe, internal and external magnetic perturbation data in response to a sampling trigger pulse, wherein the double-row magnetic sensor probe comprises an internal magnetic perturbation sensor array and an external magnetic perturbation sensor array, the internal magnetic perturbation data is collected by the internal magnetic perturbation sensor array, and the external magnetic perturbation data is collected by the external magnetic perturbation sensor array, the internal magnetic perturbation sensor array is located below a magnetization source of the magnetizer and not in contact with the magnetization source, and the external magnetic perturbation sensor array is located at any of two sides of the internal magnetic perturbation sensor array;

performing pre-processing on the internal and external magnetic perturbation data and storing the pre-processed data by a master controller; and performing a defect quantitative analysis by analyzing the pre-processed data to obtain a defect quantitative result.

* * * * *